MOUNTING DEVICE FOR VACUUM TUBE CIRCUIT ELEMENTS

Filed Dec. 3, 1947

INVENTOR.
ALBERT F. HUGHES

BY Reynolds & Beach

ATTORNEYS

Patented Jan. 6, 1953 2,624,775

UNITED STATES PATENT OFFICE 2,624,775

MOUNTING DEVICE FOR VACUUM TUBE CIRCUIT ELEMENTS

Albert F. Hughes, Des Moines, Wash., assignor, by mesne assignments, to Ray R. Scoville, Glendale, Calif.

Application December 3, 1947, Serial No. 789,507

9 Claims. (Cl. 173—328)

This invention comprises a mounting device for electronic circuit apparatus, which combines into a single convenient unit a vacuum tube socket and means for supporting the circuit elements, such as resistors and condensers, which are to be in close physical association with the vacuum tube elements, and electrically connected immediately to them through the socket connections. The invention is herein illustratively described by reference to its application to the mounting of standard circuit elements and standard vacuum tubes of the octal base type. the vacuum tube socket portion of the present mounting device resembling a standard form of octal base socket. But it is to be understood that the invention viewed broadly applies to the mounting of vacuum tubes of different or non-standard design, or it may even apply in mountings for devices other than vacuum tubes, such as for mounting any multiple-prong electric circuit component of the plug-in type, to the prongs of which various circuit elements, such as resistors or condensers, are to be connected directly and in close physical association therewith, for whatever purpose.

The standard type vacuum tube socket which is designed to be mounted in the wall of an electronic device chassis has recesses on one side which receive the prongs of a vacuum tube or similar device, and on the other side incorporates soldering or terminal lugs to which the various circuit elements and connections are secured. Frequently, particularly in inexpensive radios, or the like, the various circuit resistors, condensers, or inductances are soldered to the socket terminal lugs and allowed to extend therefrom supported only flimsily by the strength of their soldered connecting leads. When more than two or three resistors or condensers are so connected to a tube socket, each extending toward its own succeeding connecting point in the circuit device, and generally in diverse directions, the result is a maze of crossed wires and elements, which is neither convenient to assemble nor well adapted for access to any of the elements to make replacements or to conduct circuit tests.

In addition, the elements being supported only at their lead ends which are connected to the tube socket soldering lugs, the connections are tenuous and uncertain and often become broken through shock or vibration, or during the replacement or repair of other elements when the various wires must be bent aside this way and that to insert a soldering iron to melt a connection, for example, or to reach the point of difficulty with a test probe. Aside from the time consuming aspects and inconvenience of such arrangements, the requirements of aircraft and military installations, for example, are not met at all well unless all of the circuit elements are rigidly supported, readily accessible for rapid repair work, and adapted to the specialized electrical requirements of the circuits, which preclude such haphazard arrangements.

For many purposes, the use of so-called "terminal strips" is satisfactory as a means of providing rigid mechanical support for resistors, condensers, or other circuit elements, while affording convenient soldering connections for such elements. Such terminal strips usually are mounted closely to a row of associated vacuum tubes, and comprise insulating cards which have rows of soldering lugs at the opposite edges of the cards and between which rows the elements are connected in generally parallel relation. From these soldering lugs supporting the circuit elements, connections are extended to the appropriate points in the apparatus, such as the vacuum tubes. This means, however, that the circuit elements are not always in the desired locations of physical proximity to the soldering lugs of the corresponding vacuum tube sockets, and in such applications as video amplifier circuits for television, or in specialized radar applications, this is frequently objectionable, because of the resulting stray capacity incurred by the excessively long connecting leads. Moreover, such arrangements frequently do not avoid numerous crossed and interfering connections of the wires at each vacuum tube socket. In addition, such terminal strips must be mounted separately, and consume a certain amount of space in the chassis which might otherwise be employed gainfully.

Accordingly, a principal object of the present invention is to provide an improved mounting device for circuit elements accessory to vacuum tubes which will save space and facilitate assembly of such elements. Specifically, the various circuit elements associated immediately with a mounted vacuum tube are supported in physical proximity to the tube base by soldered connections of both element leads, one to a tube socket lug and the other to a specially provided lug spaced from the socket at a desired location, generally axially of the socket.

A further object of the invention is to provide improvements, in devices of the class described, which facilitate making circuit connections to external circuits.

Further purposes are to eliminate the necessity for separately mounted terminal strips, as to the circuit elements which are connected immediately to the vacuum tubes, and to enable such elements to be installed with minimum chance of error occurring in making the necessary connections to them, thus facilitating assembly, as well as testing and replacement of parts. The combined mounting means employed reduces the cost of initial manufacture of electronic devices by permitting sub-assemblies of circuit sections to be made which can be inserted very simply in a device at an appropriate later time, either in manufacture or in the military field where there is frequently no time to test a circuit to determine a source of trouble, but only to replace circuit sections bodily. Such sub-assembly units comprise a mounting device of the foregoing type and the various selected circuit elements which, together with the mounted vacuum tube, will form an integral section of the electronic circuit. Such a unit may be inserted bodily in the final assembly with no more inconvenience or difficulty than is encountered in mounting an ordinary vacuum tube in the socket itself.

These and other objects and the various features of the invention will become further apparent from the following description which is based upon the accompanying drawings.

In Figure 1 one form of my novel mounting device appears in side elevation.

Figure 3:
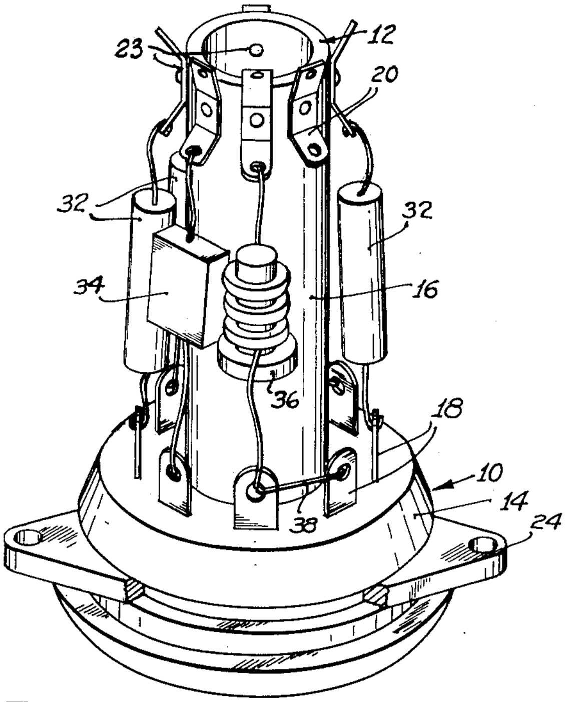
Figure 3 is a top perspective view of a typical circuit sub-assembly, including such a mounting device.

Generally my device includes a vacuum tube socket portion 10 having terminal lugs 18 arranged in a selected or common manner, projecting from one side thereof, and a terminal post 12, preferably of tubular insulated construction, projecting generally axially from such side of the socket. Near the ends of the terminal post the appropriate number of terminal soldering lugs 20 are secured, and in the proper relation to the socket lugs, between which and the socket lugs the circuit elements may be solder-connected. The particular form of the terminal post, the number and form of the terminal post connecting lugs, and various other details of construction of the device may vary somewhat within the scope of the invention, as will be evident. However, an important characteristic or attribute of the device resides in the arrangement of the groups of soldering lugs, on the socket and terminal post, by which the mounted circuit elements connected therebetween are disposed near the vacuum tube base and in orderly positions where they may be easily reached; the soldering lugs or terminals 20 including projections or eyelets 21 extending beyond the end of the post for facilitating the making of connections to external circuits.

The vacuum tube socket portion 10 and terminal post 12 may be formed integrally in a single molding operation, or may be molded or otherwise formed separately and later connected together, by threads, rivets, or otherwise. The body portion 14 of the socket is preferably formed wholly of insulating material and preferably the body portion 16 of the terminal post is also formed wholly of insulating material, although it may be metal if the terminal or soldering lugs 20 mounted on the terminal post are appropriately insulated from each other by other means. The socket may be of the usual form in which the prongs of a vacuum tube 22 (shown in dotted lines) are inserted in one side for electrical connection to the embedded ends of the circularly arranged soldering lugs 18 projecting from the opposite side of the socket.

The socket 10 may incorporate an encircling mounting ring 24 received in a peripheral groove in the socket, having apertured ears for securement by rivets or screws 26 to the chassis wall 28 of an electronic device. The particular manner in which the body of the socket is attached to the wall of the electronic device constitutes no essential part of the present invention, since the particular form of the tube socket itself is more or less optional, as will appear. But it is desirable to employ a socket with soldering lugs distributed around its portion covered by the end of terminal post 12.

Usually the base of the vacuum tube 22 has a short axially extending post 30 and the socket has a corresponding bore for receiving the tube's post. This not only serves as a convenient protective casing for the sealing tip of the vacuum tube envelope, after evacuation, but it lends additional support to the tube, facilitates placing it in the socket, and carries a longitudinally extending key which is received in a corresponding keyway in the wall of the socket 14 to insure that the vacuum tube prongs are received in the appropriately numbered socket holes, for purposes of identification. If a terminal post of tubular form is employed in connection with my improved mounting device, the inner wall of the tube 16 may, for convenience in molding, coextend with the bore in the socket. This is not essential, however, since the inner diameter of the tube may be of any size, or a solid post may be used instead.

The number of terminal lugs 20 mounted on the terminal post 12 remote from the socket 10 may vary to meet different requirements. There may, for instance, be a number equal to the number of soldering lugs on the socket, as appears in Figure 3, or there may be a lesser number, such as 4, with an octal base tube, as appears in Figure 1. Again, locations of these lugs and the length of the terminal post may vary with particular requirements. Preferably, and for standard circuit components, the arrangement of the terminal lugs 20 about post 12 should correspond to that of the soldering lugs 18 about the socket, and the separation of the two sets of lugs axially of the post will be in the order of 2 inches, the lugs 20 being preferably mounted near the outer end of the post. Also the lugs 20 preferably are aligned respectively in the same diametral planes with the soldering lugs 18 of the socket to which they correspond. If desired the post could extend well beyond the mounting locations of the lugs 20, and carry a group of similar lugs at a location still more remote from the tube socket lugs.

Figure 1:
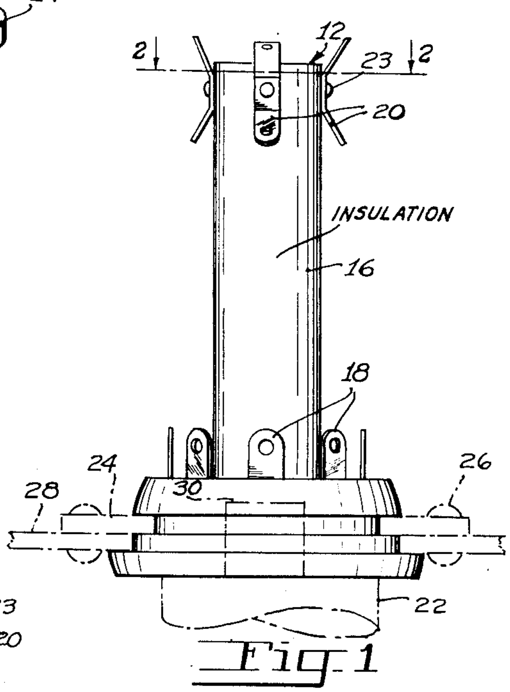

In Figure 3 a typical sub-assembly unit is shown, comprising the mounting device of the type shown in Figure 1, on which are mounted appropriate circuit elements, such as the resistors 32, condenser 34 and inductance element 36. This may, for example, represent the sub-assembly circuit section of a video amplifier or similar circuit.

As in the typical circuit case, several of the socket soldering lugs may be connected directly together, as by the short wires 38. Such a sub-assembly unit as this is easily fabricated, its connections may be made with little chance of error and their accuracy may be checked readily.

Figure 2:
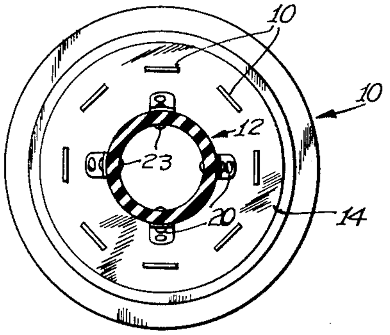
Figure 2 is a sectional view of Figure 1, taken along line 2—2.
Figure 4:
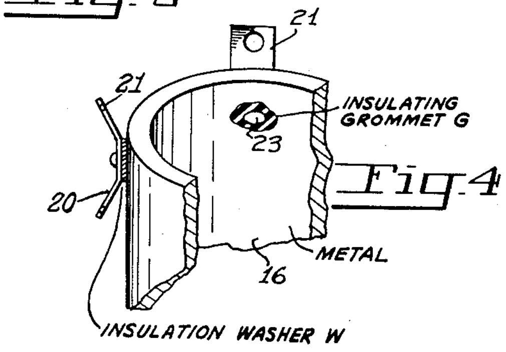
Figure 4 is a fragmentary perspective view of a modified form of the invention.

Figure 4 illustrates a modified form of the invention which is identical in all respects with the device shown in Figures 1 to 3 except as will now be described in detail. Instead of a post 12 of insulating material as shown in Figure 1, the post 16 of Figure 4 is metallic. The terminals 20 (which carry eyelets or projections 21) are attached to the metallic post 16 by means of rivets 23; the terminals and rivets being insulated from the post by means of insulating washers W and insulating grommets G.

In Figures 1 to 4, the lugs or terminals 20 have a pair of eyelet ears 21, extending vertically on each side of the web secured by pin 23 to the tube wall 16. The circuit elements connected to the socket soldering lugs may be connected to the ears of the post lugs projecting toward the socket lugs, while the longer, external circuit leads may then be connected to the ears of the lugs projecting away from the socket lugs, thus separating the soldered connections. In both forms of the invention the connection lugs are readily mounted on the terminal post by rivets or eyelets 23, because of the tubular form of the post. From a manufacturing standpoint, with a solid terminal post it might still be desirable to recess its outer end, making it tubular, to permit this simple riveted attachment of the lugs to be used, although other forms of mountings for the lugs are available.

Figure 5:
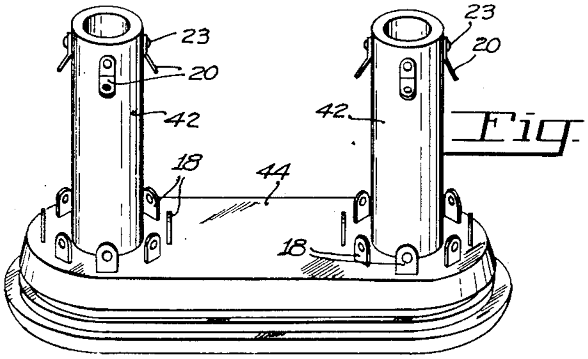
Figure 5 is a top perspective view of a multiple type mounting device having facilities for two vacuum tubes and including two terminal posts.

In Figure 5 appears a modified form of the mounting device which includes two socket portions formed in a solid plate of insulating material, each having terminal posts associated with it, enabling the sub-assembly of larger circuit sections to mount more than one tube, where that is desired. The mounting and arrangement of the lugs on each of the terminal posts 42 and on the socket plate 44 may be made as previously described in connection with the single post and socket form.

Such a mounting device may be very cheaply manufactured, and aside from its virtue in respect to the convenience with which the circuit elements may be soldered in position or readily replaced or tested, the entire unit may be installed by the same simple steps which usually attend the installation of an ordinary vacuum tube in the socket. Moreover, the amount of space saved in the chassis of an electronic device is substantial, especially if it includes a large number of tubes and associated accessories, while the use of such a mounting device will enable substantial savings in manufacturing electronic apparatus, by sub-assembling parts and reducing the time and effort in making and checking connections. Replacement of elements in the field, when circuit elements burn out or become defective, is also facilitated.

I claim as my invention:

1. A mounting means for circuit components associated with elements of an electronic tube having a plurality of parallel prongs, said mounting means including an electronic tube holder comprising an insulating block, a plurality of metallic socket elements mounted within said block for receiving said prongs and for mounting said tube on one side of said block, said elements having a corresponding plurality of terminals carried by the insulating block and constituting a first set of terminals, a second set of terminals located beyond said other side, and a rigid structure coupled to said block for maintaining the first and second sets of terminals in predetermined fixed relationship to each other, said structure including insulating means for insulating the terminals of the first set from those of the second set and those of the second set from each other, a plurality of said terminals of the second set each including a portion extending beyond the end of said structure in a direction away from the electronic tube holder, the terminals of the first and second sets being accessible to permit the soldering of leads of circuit components between terminals of the two sets while the terminals are being held in said predetermined fixed relationship by said rigid structure.

2. A mounting means for circuit components associated with elements of an electronic tube having a plurality of parallel prongs, said mounting means including an electronic tube holder comprising an insulating block, a plurality of metallic socket elements mounted within said block for receiving said prongs and for mounting said tube on one side of said block, said elements having a corresponding plurality of terminals projecting beyond the socket elements and beyond the other side of said block and constituting a first set of terminals, a second set of terminals located beyond said other side, a rigid structure coupled to said block for maintaining the first and second sets of terminals in predetermined fixed relationship to each other, said structure including insulating means for insulating the terminals of the first set from those of the second set and those of the second set from each other, and means for connecting the terminals of the second set to an external circuit comprising metallic portions extending beyond the end of said structure, the terminals of the first and second sets being accessible to permit the soldering of leads of circuit components between terminals of the two sets while the terminals are being held in said predetermined fixed relationship by said rigid structure.

3. A mounting means as defined in claim 2 in which the first set of terminals are positioned on a circle and in which said structure includes a single post attached to the tube holder within said circle and extending away therefrom along the axis of said circle.

4. A mounting means as defined in claim 3 in which said post consists of insulating material.

5. In a mounting means for circuit components associated with the elements of an electronic tube having a plurality of prongs, the combination of: a tube holder comprising an insulating block with at least a corresponding plurality of socket elements seated within said block to receive said prongs, said socket elements continuing and projecting away from the seats for said socket elements in said block to form a set of socket terminals, a metallic post, one end of said post being centrally secured to said block, the outer periphery of said post being sufficiently small to leave an insulating gap between said socket terminals and said post, and a plurality of metallic terminals insulated from each other and mounted on said post, said socket terminals and said metallic terminals furnishing means for mounting said circuit components between said terminals.

6. A mounting means for circuit components associated with electronic tubes; said mounting means including a plurality of tube sockets having a plurality of socket elements; said tubes being mounted on the outer sides of said sockets; a post for each socket; said post being in fixed relationship with respect to each socket and extending away from the inner side of said sockets; an insulating member for connecting the sockets to form a unitary structure including said sockets, said posts and said insulating member; and a plurality of metallic terminals connected to and supported by each of said posts for mounting at least some of said circuit components between said terminals and said socket elements.

7. A mounting means as defined in claim 2 in which said metallic portions comprise eyelets.

8. A device as defined in claim 5 in which said mounting post is a metallic tube, each of said metallic terminals having means cooperating therewith which extends through the wall of said tube to secure the terminal to the tube, and insulating means for each terminal to insulate it from the tube.

9. A mounting means as defined in claim 5 in which said metallic terminals are mounted adjacent that end of the post which is remote from the tube holder and comprise soldering lugs located beyond said end of the post and projecting in a direction away from the tube holder.

ALBERT F. HUGHES.

REFERENCES CITED

The following references are of record in the file of this patent:

UNITED STATES PATENTS

| Number | Name | Date |
|---|---|---|
| 1,293,594 | Willey | Feb. 4, 1919 |
| 1,965,202 | Roys | July 3, 1934 |
| 2,111,381 | Barton | Mar. 15, 1938 |
| 2,323,628 | Smith | July 6, 1943 |
| 2,377,893 | Lorenzen | June 12, 1945 |
| 2,436,756 | Larkin | Feb. 24, 1948 |

FOREIGN PATENTS

| Number | Country | Date |
|---|---|---|
| 807,990 | France | Oct. 26, 1936 |